UNITED STATES PATENT OFFICE.

HANS LUMBYE AND ABRAM DE BEVOISE, OF BROOKLYN, NEW YORK.

COMPOUND FOR SKATING-RINKS AND OTHER PURPOSES.

SPECIFICATION forming part of Letters Patent No. 277,043, dated May 8, 1883.

Application filed July 21, 1882. (No specimens.)

*To all whom it may concern:*

Be it known that we, HANS LUMBYE and ABRAM DE BEVOISE, of Brooklyn, in Kings county, and the State of New York, have invented a new and useful Compound for Skating-Rinks and other Purposes, of which the following is a specification.

The principal object of our invention is to produce a compound which may be used in skating-rinks as a substitute for ice, and on which persons may skate with the skates which are ordinarily used on ice. The compound which we produce is, however, useful for other purposes.

Our improvement consists in a compound composed of soluble glass, fluor-calcium, asbestus, paraffine, ground glass or flint, and soapstone, mixed in certain proportions hereinafter specified.

The improvement also consists in the combination, with such compound applied to the floor for skaters' use, of a superposed coating of soluble glass and a final coating of paraffine smoothed down with a heated roller.

The improvement also consists in the compound made of soluble glass, asbestus, and paraffine, for coating tanks, roofs, and other like articles.

In carrying out this improvement for producing a skating-surface we take of soluble glass about thirty (30) parts, by weight; of fluor-calcium about ten (10) parts, by weight; of asbestus about thirty (30) parts, by weight; of paraffine about five (5) parts, by weight; of ground glass or flint thirteen (13) parts, by weight, and of soapstone about twelve (12) parts, by weight. We mix all these ingredients together by means of any suitable mixing apparatus or paint-mill. It is not necessary that they should be heated during this operation. When the mixing operation shall have been carried far enough to reduce all the ingredients to a finely-disintegrated condition and render the mass homogeneous, the compound is ready for use. It is then applied to a flooring of boards or other material. It will firmly adhere to the same, and will be in a measure plastic and yielding. When set we preferably apply to the surface a thin coating of soluble glass, and afterward we apply a thin coating of paraffine. The latter we render absolutely smooth by passing a heated roller over it. We thus produce a very desirable skating-surface. When it becomes so cut up as to need dressing a heated roller is again passed over it; or, if necessary, new coating of the soluble glass and paraffine may be applied to it as before.

We produce a very valuable coating for tanks, roofs, and like articles by mixing together, in the manner before described, soluble glass, asbestus, and paraffine in about the proportions above set forth.

What we claim as our invention, and desire to secure by Letters Patent, is—

1. The compound made of soluble glass, fluor-calcium, asbestus, paraffine, ground glass or flint, and soapstone, combined in about the proportions hereinabove set forth.

2. The skating-surface consisting of the compound made of soluble glass, fluor-calcium, asbestus, paraffine, ground glass or flint, and soapstone, in conjunction with a superposed coating of soluble glass and a coating of paraffine, substantially as specified.

3. The compound made of soluble glass, asbestus, and paraffine, in about the proportions set forth, and for the purposes specified.

H. LUMBYE.
A. DE BEVOISE.

Witnesses:
T. J. KEANE,
JAMES R. BOWEN.